Figure 1:
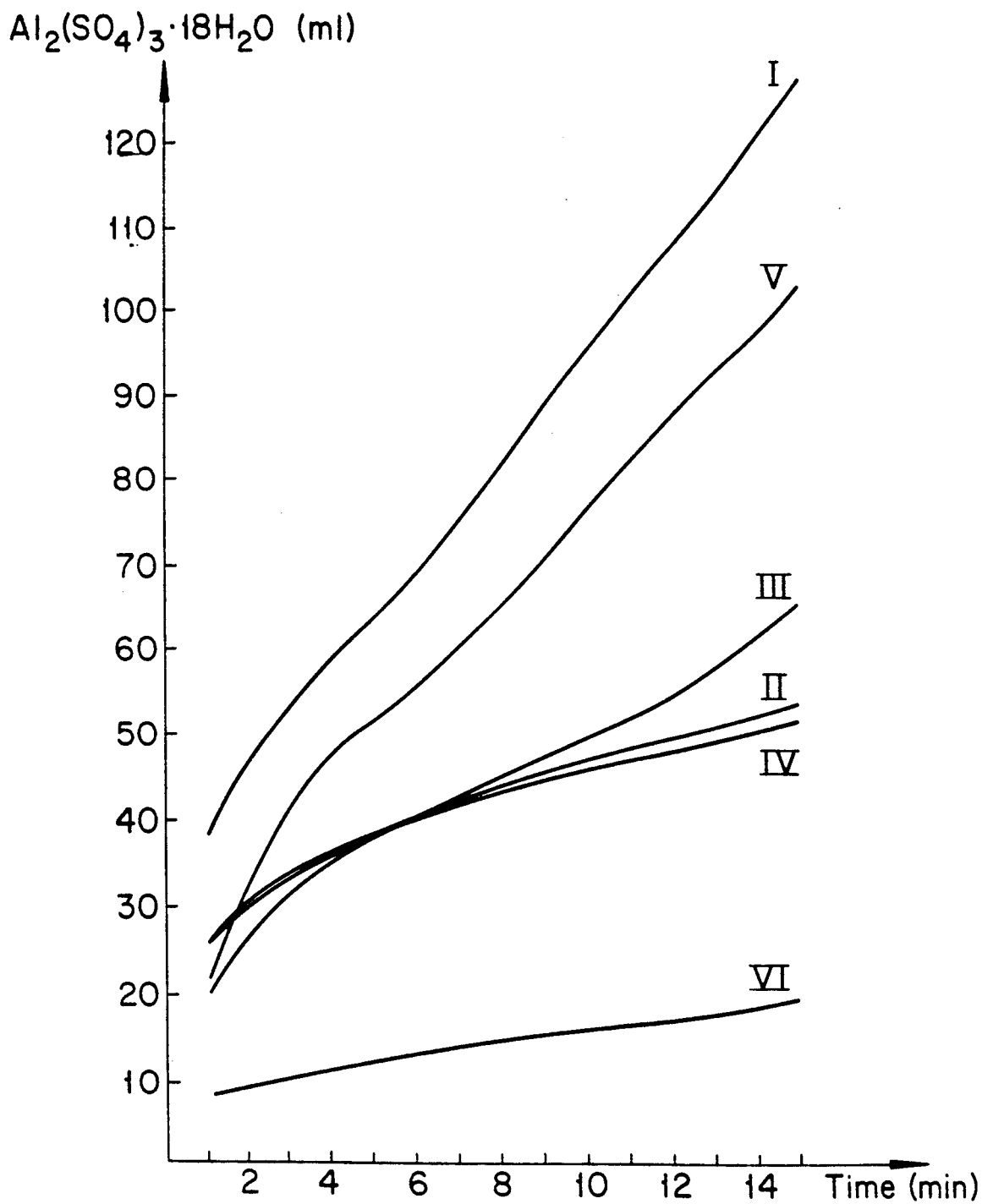

United States Patent [19]

Tokarz et al.

[11] Patent Number: 5,037,477
[45] Date of Patent: Aug. 6, 1991

[54] PROCESS FOR THE PREPARATION OF AN ACID-RESISTANT COATING ON FILLER PARTICLES

[75] Inventors: Marek Tokarz; Sven Järas, both of Kungälv; Rein Sikkar, Floda, all of Sweden

[73] Assignee: Eka Nobel AB, Surte, Sweden

[21] Appl. No.: 603,293

[22] Filed: Oct. 25, 1990

Related U.S. Application Data

[62] Division of Ser. No. 382,318, Jul. 20, 1989.

[30] Foreign Application Priority Data

Jul. 22, 1988 [SE] Sweden .................. 8802708

[51] Int. Cl.$^5$ ............................................. C09C 3/00
[52] U.S. Cl. ................................. 106/464; 106/465; 162/181.1
[58] Field of Search .................. 106/463, 464, 465; 162/181.1, 181.2

[56] References Cited

U.S. PATENT DOCUMENTS 4,167,423  9/1989  Williams .......................... 106/306

Primary Examiner—William R. Dixon, Jr.
Assistant Examiner—Gallo Chris
Attorney, Agent, or Firm—Burns, Doane, Swecker & Mathis

[57] ABSTRACT

The invention relates to a process for the preparation of an acid-resistant coating and calcium carbonate particles, in which process a slurry of calcium carbonate particles is mixed simultaneously with the solution of a zinc compound and a solution of a silica-containing substance at a temperature of 70°-95° C., the pH being maintained at 8-11.

The invention also relates to calcium carbonate particles having an acid-resistant coating in accordance with the above-mentioned process.

In addition, the invention relates to the use of calcium carbonate particles having a acid-resistant coating in accordance with the above-mentioned process, as an acid-resistant filler in the production of paper at pH 4.0-7.0.

5 Claims, 1 Drawing Sheet

PROCESS FOR THE PREPARATION OF AN ACID-RESISTANT COATING ON FILLER PARTICLES

This application is a divisional, of application Ser. No. 07/382,318, filed July 20, 1989 pending.

The present invention relates to a process for the preparation of an acid-resistant coating on filler particles for e.g. paper by mixing slurried calcium carbonate particles simultaneously with a solution of a zinc compound and a solution of a silica-containing substance. The invention also relates to such coated particles, and to the use thereof as a papermaking filler.

BACKGROUND

Fillers in the form of finely divided particulate or plate-shaped inorganic materials are in general use in the manufacture of, for example, paper, paint, printing ink and rubber. In this connection, calcium carbonate is in common use and has the advantages of being in ample supply and cheap. However, its low acid-resistance is a disadvantage, especially in the papermaking industry. Thus, calcium carbonate, when used as a filler in paper, is inconvenient in so far as its reacts with alum which is also used in papermaking. Alum which is aluminium sulphate ($Al_2(SO_4)_3.18H_2O$), produces aluminium hydroxide and sulphuric acid when added to the "wet" papermaking system. The flocculation of aluminium hydroxide is capable of collecting and retaining the filler and also part of the resin-alum system for paper sizing. During manufacture, the alum flocks in the paper web are removed, and the sulphuric acid is increasingly concentrated in the white water, in spite of the buffer action of the system. The presence of calcium carbonate in a system of pH 4 will quickly consume part of the sulphuric acid, thereby forming calcium sulphate and free $Ca^{2+}$ ions. The presence of these ions in the recycled white water causes a considerable reduction of the sizing effect in the papermaking pulp, and this in turn necessitates the use of large amounts of alum to maintain stable sizing conditions.

A variety of techniques to modify calcium carbonate by surface treatment to achieve higher acid-resistance are disclosed in literature.

GB 1,295,264 discloses particulate surface-treated calcium carbonate adapted to be used as a filler and treated with an aqueous solution of, inter alia, water glass to coat the particles with a shell of, inter alia, calcium silicate, whereby it is possible to reduce solubility by at least 50% in an alum solution at a pH of about 5.5. However, the stability of this shell is not entirely satisfactory since it may break loose or be dissolved out upon further working of the paper product.

DE-A 3,014,620 discloses surface-modified calcium carbonate particles that have been treated with a solution containing specific cations of similar size, inter alia zinc ions, whereby the calcium ions in the crystal lattice are replaced by, inter alia, zinc ions, and this results in an improved acid-resistance and higher stability than with the first-mentioned technique. Nevertheless, a certain amount of alum is still precipitated in papermaking, for which reason the acid-resistance should be improved further.

SE-A 415,028 discloses the modification of inorganic fillers, for example calcium carbonate, by organosilane modification and metal silicate treatment of the filler.

THE INVENTION

It has now been found that a modification with a silica-containing compound combined with a modification of a zinc-containing compound imparts to calcium carbonate to be used as a filler an acid-resistance significantly higher than can be obtained with prior art technique, if the combination is conducted such that both additions are made at the same time.

By testing different variants of stepwise addition and simultaneous addition it was found that stepwise additions give but an insignificant improvement of the acid resistance in relation to the individual effects, whereas the simultaneous addition causes a synergistic effect resulting in a surprisingly significant improvement of the acid-resistance.

The present invention thus relates to a process having the characteristic features stated in the appended claims, for the preparation of a surface-modified filler of calcium carbonate acid-resistant at pH 4.5-7, which makes it useful as a filler in paper produced by acid technique and treated with alum upon sizing.

According to the invention, a slurry of $CaCO_3$ filler particles is mixed simultaneously with a solution of a zinc compound and a solution of a silica-containing substance which preferably is sodium water glass. The zinc compound preferably is zinc chloride or zinc oxide. The two solutions are added at a temperature of 70°-95° C., preferably 85°-95° C., especially preferred 90° C. Furthermore, the addition is carried out pH 8-11, preferably 9-10, especially preferred 9.2-9.4. The added amounts of coating agent, i.e. of a silica-containing substance, preferably water glass, and of a zinc compound, preferably zinc chloride, are 300-400 parts by weight $SiO_2$ and 40-60 parts by weight Zn. The $SiO_2$:Zn ratio is 7.5:1 to 6.6:1, which corresponds to pH 8-11.

The simultaneous addition implies that the two substances are added without any intervening treatment step, the addition being initiated in principle at the same time or with as little a time lag as possible and conducted at substantially the same flow rate.

To carry the process according to the invention into effect, one proceeds as follows. A slurry of calcium carbonate particles (PCC—Precipitated Calcium Carbonate, milled chalk or other $CaCO_3$ filler) in deionised water is added simultaneously with a diluted solution of $ZnCl_2$ or ZnO and with a diluted Na water glass solution containing $SiO_2$ and vigorously stirred. The addition is carried out at a tempeture of 70°-95° C. By optionally adding 0.1 M $H_2SO_4$, the pH is adjusted during the process to 8-11. After filtration, washing and drying, the surface-modified particles can be used as filler.

The acid-resistance (AR—Acid-Resistance) is measured in the following manner. A 4% PCC slurry is admixed for 10-20 min, preferably about 15 min, and under intense agitation with a 10% or 20% solution of alum ($Al_2(SO_4)_3.18H_2O$) in an amount maintaining a given pH (4.5-5.5) measured by means of a pH electrode. The amount of alum consumed can be illustrated as a function of the time (see FIG. 1 which will be described in more detail hereinafter).

The following Examples are given to illustrate the invention. In these Examples, all parts and percentages are by weight, unless otherwise indicated.

EXAMPLE 1 the invention

A slurry containing 2 kg PCC (Precipitated Calcium Carbonate) in 10 l water was prepared and heated to 90° C., whereupon commercial 28% Na water glass and 5.9% aqueous solution of $ZnCl_2$ were added simultaneously and slowly to the slurry and vigorously stirred. The ratio of Na water glass to $ZnCl_2$ solution was continuously and carefully checked to maintain the slurry at a constant pH of 9.2–9.4.

The amount of Na water glass employed was 1429 g (28%), while the amount of 5.9% $ZnCl_2$ solution was 2125 g. After 3 hours and 10 min, the entire amount of $ZnCl_2$ solution had been consumed, and a 10.9% $H_2SO_4$ solution was added to maintain the slurry at a constant pH of 9.2–9.4 for the remaining reaction time. The coating reaction was completed after 5 hours and 6 min, when the entire amount of Na water glass had been consumed.

The resulting product was cooled, filtered, washed 2 times with water and dried at 100° C., whereupon acid resistance tests at different pH of 4.5–5.5 were carried out and compared with an untreated PCC sample. The results regarding the consumption of a 10% or 20% alum solution during 15 min for both samples were as follows.

At pH 5.5, a coated PCC sample (PCC-46) consumes but 17.8 ml 10% alum solution, whereas the uncoated sample (PCC-0) consumes 125 ml of the same solution.

The same coated PCC sample consumes at the same pH 5.5 but 11.7 ml 20% alum solution, whereas the uncoated sample (PCC-0) consumes 53.1 ml of the same solution.

At pH 5.0, the coated sample (PCC-46) consumes 17.6 ml 20% alum solution, and the uncoated sample (PCC-0) 107.9 ml of the same solution.

At pH 4.5, the coated PCC-46 consumes 25.9 ml 20% alum solution. For the uncoated sample PCC-0 no measured value could be obtained since this sample reacted violently with the acid so that it was impossible to achieve or maintain the low pH.

The above results indicate that the applied $SiO_2/Zn$ coating imparts to the PCC particles an adequate protection against attack by acid alum solutions, and that the consumption of alum solution can be reduced to 80–90% by the above-mentioned protective layer.

EXAMPLE 2 the invention

A slurry of PCC, Na water glass and $ZnCl_2$ solution was prepared in the same manner as in Example 1. The pH was maintained costantly at the same level, i.e. 9.2–9.4. The amount of Na water glass was 1071 g 28% solution, and the amount of $ZnZl_2$ was 1418 g 5.9% solution. Upon simultaneous addition of these solutions under agitation, the slurry was heated to 95° C., whereby the reaction time was cut down to 2 hours and 45 min. After 1 hour and 45 min, when all $ZnCl_2$ had been consumed, a 10.9% $H_2SO_4$ solution was used for the remainder of the reaction time to adjust pH to 9.2–9.4. The resulting product was finish-treated and acid tested in the same manner as in Example 1.

Acid tests conducted with 10% alum solution show that also the coated PCC sample (PCC-47) can resist acid attack at pH 5.5. The amount of consumed 10% alum solution was 24 ml, whereas an uncoated sample consumes 120 ml of the same solution.

It is noted that the amounts of both $SiO_2$ and Zn applied to the PCC particles in this Example are lower than in the particles prepared in accordance with Example 1, but that the total improvement in relation to uncoated particles is still about 80%.

EXAMPLE 3 comparison; $SiO_2$ coating only

The same slurry as in Example 1 was heated to 90° C., whereupon 1429 g 28% Na water glas was slowly added at a constant pH of 9.2–9.4 for a period of 5 hours. A 10% $H_2SO_4$ solution was used for pH adjustment. The resulting product was filtered, washed and dried.

The acid-resistance test of the product (PCC-48) showed that 52.3 m 10% alum solution was consumed at pH 5.5 and during 15 min, which is about 3 times more than for the product prepared in accordance with Example 1.

EXAMPLE 4 comparison; $ZnCl_2$ coating only 2125 g 5.9% $ZnCl_2$ solution was added to a slurry containing 2000 g PCC in 10 l water. The slurry was stirred for 20 min at room temperature, filtered, washed and dried.

The acid-resistance test of the resulting product (PCC 24) at pH 5.5 indicates that an amount of 64.1 ml 10% alum solution is consumed during 15 min, which is almost 3.5 times more than for the product prepared in accordance with Example 1. Treating PCC particles with $ZnCl_2$ solution only or with Na water glass solution only results in a product having an acid-resistance which is about 3–4 times lower than the resistance of the product obtained in Example 1.

EXAMPLE 5 comparison; first $ZnCl_2$, then $SiO_2$

The surface of a PCC sample (PCC-41) was treated in two steps. First, a slurry containing 2 kg PCC and 10 l water was treated in the same manner as in Example 4. After filtration and washing, the PCC cake was dispersed in 10 l fresh water and heated to 90° C. Then, 1429 g 28% Na water glass was added to the slurry for a period of 5 hours, the pH being maintained constant at 9.2–9.4 by means of 10.9% $H_2SO_4$. The resulting product was filtered, washed and dried.

The acid-resistance test on the product (PCC 41) indicated that 51 ml 10% alum solution was consumed at pH 5.5 and for 15 min, which is almost the same result as the one obtained in Example 3, whereas the coated product according to the invention has a far higher acid-resistance.

EXAMPLE 6 comparison; first $SiO_2$, then $ZnCl_2$

The surface of a PCC sample was treated in two steps in the same manner as in Example 5, but with the difference that the first step involved treatment with Na water glass and the second step treatment with $ZnCl_2$.

The acid-resistance test on the product (PCC-37) indicated that 101 ml 10% alum solution was consumed at pH 5.5 during 15 min, which indicates that this coating type is less satisfactory than the coatings according to Examples 3 and 4. The reasons for this have not been explained, but it is assumed that the $SiO_2$ coating as first applied blocks the exchange reaction in the crystal lattice that is normally obtained when zinc ions are added, and that furthermore the subsequent addition of zinc ions destroys the $SiO_2$ coating as first applied. Upon a simultaneous and slow addition under the conditions stated in the appended claims, there is obtained instead a favourable cooperation of the two different types of coating agents so that both the crystal lattice and the outer surface are affected.

For the different coating types according to Examples 1-6, using a 4% PCC slurry, FIG. 1 shows the acid-resistance in the form of the alum consumption as a function of the time at pH 5.5. Curve I relates to an uncoated PCC sample, curve II to a sample coated with 20% $SiO_2$, curve III to a sample coated with 3% $ZnCl_2$, curve IV to a sample coated first with 3% $ZnCl_2$ and then with 20% $SiO_2$ in two separate steps, curve V to a sample coated first with 20% $SiO_2$ and then with 3% $ZnCl_2$ in two separate steps, and curve VI to a PCC sample coated simultaneously with 20% $SiO_2$ and 3% $ZnCl_2$.

The Figure clearly shows the superior acid-resistance properties of the product according to the invention.

EXAMPLE 7 large-scale production in accordance with the invention

A PCC slurry containing 35 kg uncoated PCC in 150 l water was heated to 94° C. and vigorously stirred, whereupon 25.4 kg 27.55% Na water glass and 12.7 kg 17.3% $ZnCl_2$ solutuion were slowly and simultaneously added. The pH of the slurry was maintained constant at about 9.3. After 3 hours, all $ZnCl_2$ had been consumed, and a 48% $H_2SO_4$ solution was used for maintaining the pH of the coating reaction constant. After 4 hours and 55 min, when all Na water glass had been added, the slurry was cooled and left over night without agitation. Then the limpid solution above the PCC cake was removed, fresh water added, and the slurry redispersed. The solvent exchange was made twice, whereupon a 20% slurry of coated PCC was prepared. Small samples were taken, dried and tested in an AR test (acid-resistance). 14,5 ml of 10% alum solution had been consumed, implying a reduction of the alum consumption by about 88% as compared with an uncoated PCC sample (alum consumption 120 ml).

EXAMPLE 8 use of the product according to the invention

A slurry of a PCC material coated in accordance with the invention was added to a slurry of a papermaking pulp to test its effect as a filler in paper produced by resin/alum sizing technique. The pH of the pulp was adjusted to 4.0. After 1 hour of production, the amount of $Ca^{2+}$ ions in the white water system was about 27 ppm, while the fresh water used in the production contained 25 ppm $Ca^{2+}$ ions, which shows that a $SiO_2$/Zn-coated PCC filler is sufficiently resistant to the acid environment of the pulp (pH 4.0). The quality of the paper produced by using coated PCC as filler was unchanged in comparison with the reference quality that had been produced without using PCC ($TiO_2$ and clay). It was also noted that the opacity of the paper containing PCC was higher than the opacity of the reference paper employed.

The above Example thus shows that a PCC filler coated with silica/zinc compound $SiO_2$/Zn according to the invention is a useful paper filler in a papermaking process utilising resin/alum sizing technique.

We claim:

1. A method of using calcium carbonate particles having an acid-resistant coating as a filler in the production of paper at a pH of 4.0-7.0, the particles having been produced by mixing a slurry of calcium carbonate particles simultaneously with the solution of a zinc compound and a solution of a silica-containing substance at a temperature of 70°-95° C. and a pH of 8-11.

2. The method according to claim 1 wherein the silica containing compound is sodium water glass.

3. The method according to claim 1 wherein the zinc compound is zinc chloride or zinc oxide.

4. The method according to claim 1 wherein the temperature is 85°-95° C.

5. The method of claim 1 wherein the pH is 9-10.

* * * * *